(No Model.)  2 Sheets—Sheet 1.
M. P. SCHENCK.
CIDER OR WINE PRESS.
No. 325,976. Patented Sept. 8, 1885.
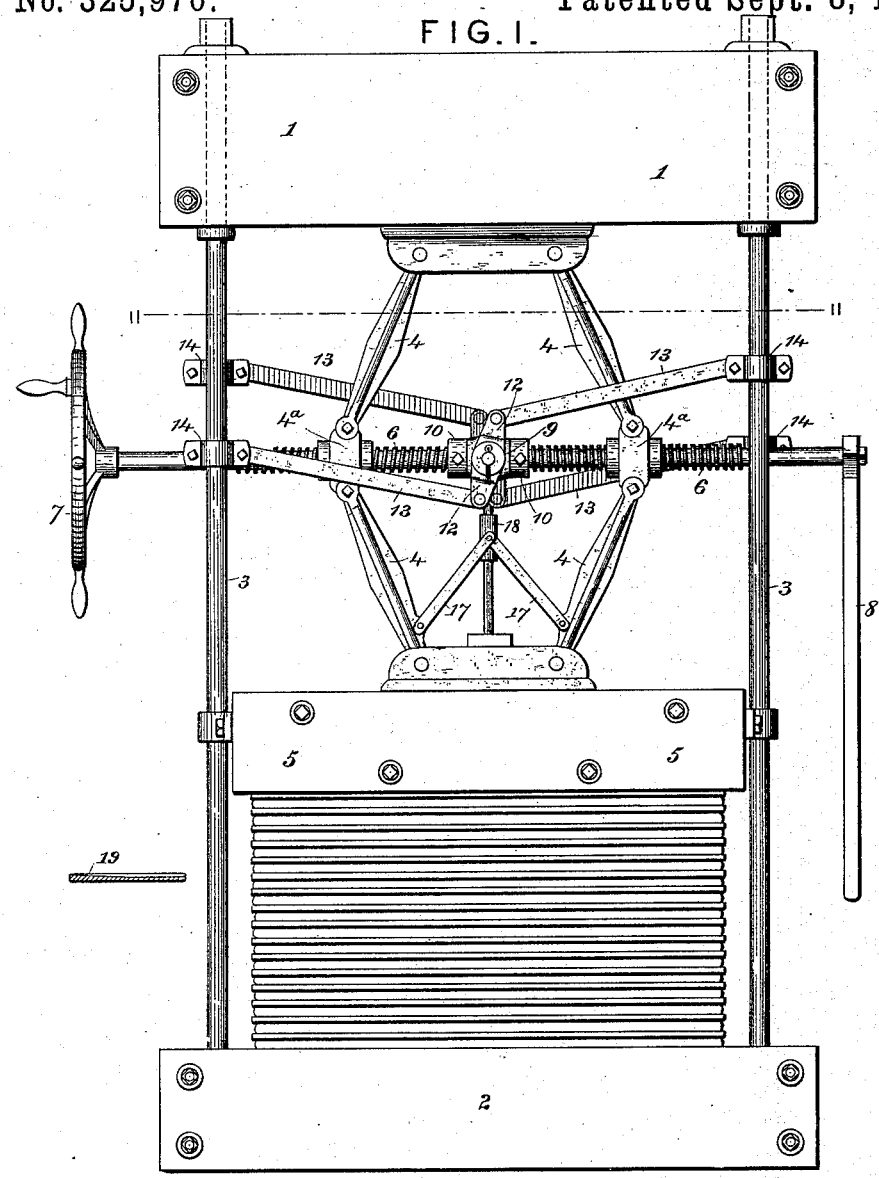
FIG. I.
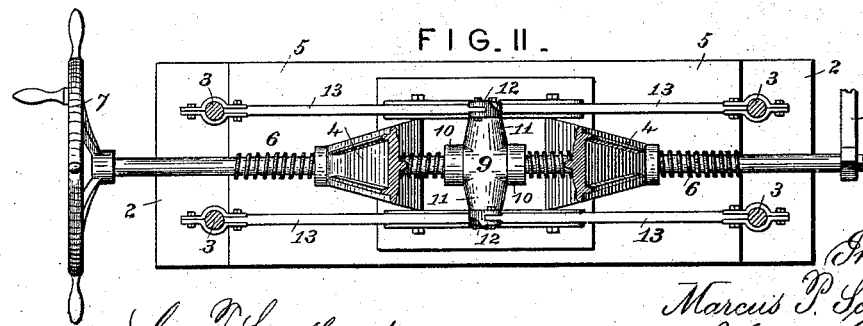
FIG. II.
Attest: Geo. T. Smallwood, A. E. Trumbull
Inventor: Marcus P. Schenck
By Knight Bros., Attys.

(No Model.) 2 Sheets—Sheet 2.
M. P. SCHENCK.
CIDER OR WINE PRESS.
No. 325,976. Patented Sept. 8, 1885.
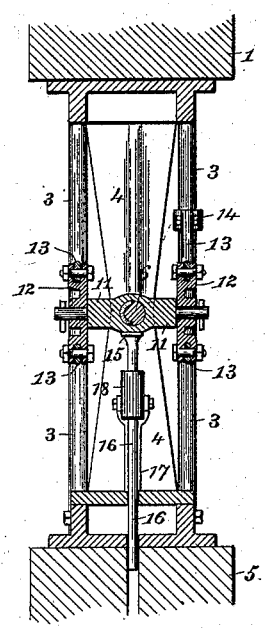
FIG. III.
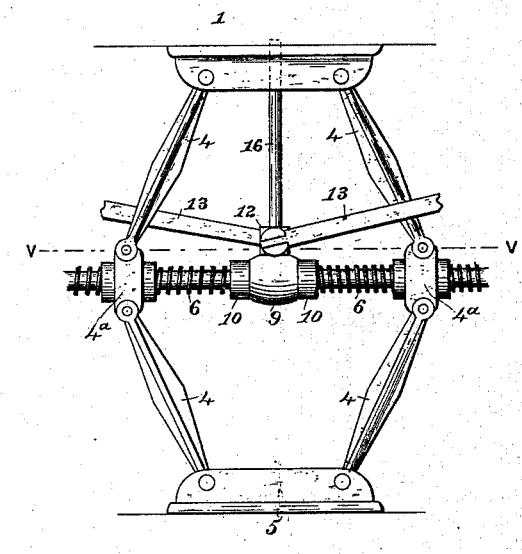
FIG. IV.
FIG. VI.
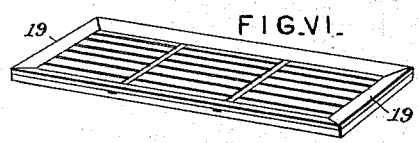
FIG. V.
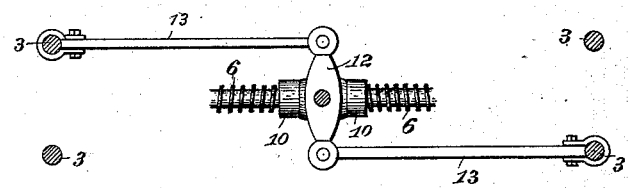
Attest,
Geo. T. Smallwood
A. E. Trumbull
Inventor,
Marcus P. Schenck,
By Knight Bros
attys.

UNITED STATES PATENT OFFICE.

MARCUS P. SCHENCK, OF FULTON, NEW YORK.

CIDER OR WINE PRESS.

SPECIFICATION forming part of Letters Patent No. 325,976, dated September 8, 1885.

Application filed July 18, 1884. Renewed March 6, 1885. (No model.)

*To all whom it may concern:*

Be it known that I, MARCUS P. SCHENCK, a citizen of the United States, residing at Fulton, in the county of Oswego and State of New York, have invented certain new and useful Improvements in Cider or Wine Presses, of which the following is a specification.

The invention relates, primarily, to means for preventing endwise movement of the operating-screws of "toggle-presses," and, secondarily, to the construction of the pressboards for use with presses of large capacity; and in order that it may be fully understood I will describe it with reference to the accompanying drawings, in which—

Figure I is a front elevation of a press with my invention applied. Fig. II is a horizontal section thereof on the line II II, Fig. I. Fig. III is a vertical section thereof on the line III III, Fig. I. Fig. IV is a front elevation showing a modification, and Fig. V is a horizontal section thereof on the line V V, Fig. IV. Fig. VI is a perspective view of one of the press-boards.

1 represents the upper and 2 the lower crosshead, which are connected together by four uprights or standards, 3. 4 4 are the togglelevers, connected at their upper ends to the upper cross-head, 1, and at their lower ends to the follower 5. 6 is the operating-screw, which passes through nuts $4^a$ of the toggle-levers 4, and receives a hand-wheel, 7, and a lever, 8, at its respective ends, by which it may be rotated to operate the press. All of these parts may be of any construction.

9 is a sleeve placed loosely on the center of the screw and confined by collars 10 10, placed at each end thereof. This sleeve is provided with trunnions 11, on which are mounted rock-arms 12, the opposite ends of which are connected with the opposite sides of the press or to the standards 3 through the medium of rods or bars 13 and clips 14. In the preferred form of the device two sets of these equalizing-levers are employed, one on each side of the screw, articulated so as to move in vertical planes; but it is obvious that the result could be accomplished with just one set. When one set only is employed, it is preferred to place the rock-arm 12 in a horizontal position and secure its ends to the connecting-rods through the medium of universal joints, as shown in Figs. IV and V. In either case it will be apparent that as the screw rises or falls the equalizing-levers will be lengthened or shortened, as the case may be, and the screw effectually held against endwise thrusts.

In order to prevent the sleeve 9 from turning with the screw 6, it is provided with a hollow or other boss, 15, to which is secured an arm, 16, which may work through an opening in the follower 5, as shown in Fig. I, or through an opening in the upper cross-head, 1, as shown in Fig. IV. If desired, this arm when placed below the screw may be made sufficiently stout to restrain the lower arms of the toggle-levers 4 and the follower 5 against swinging; but it is preferred to employ for this purpose another set of equalizing-levers, as now to be described.

17 17 are two arms, which are pivotally connected at their outer extremities to the lower arms of the toggle-levers 4, near their lower ends, and at their inner extremities to a sleeve, 18, mounted to slide upon the arm 16. By this means the follower is effectually held against swinging.

It has been found exceedingly difficult or impossible, in operating presses of large capacity, to lay up the immense quantities of cheese in such a manner that it will be thoroughly pressed at its edges, and to overcome this difficulty I have devised a press-board, such as represented at 19, which is of greater thickness at its edges than at its center. By the use of a board constructed in this way the pressure on all the cheese will be equalized, as it is evident that any excessive pressure at the outer margin will cause the cheese to flow or move toward the center until the pressure upon all parts of the mass is equal, or nearly so.

Having thus described my invention, the following is what I claim as new therein and desire to secure by Letters Patent:

1. In a cider-press, the combination, with the press-frame and the actuating-screw, of a system of equalizing-levers connected to said screw and to the opposite sides of the frame, whereby said screw is permitted to move freely in a vertical plane and is held against endwise movement, as explained.

2. In a cider-press, the combination, with the actuating-screw, of a sleeve fitted loosely thereon and confined against longitudinal movement relatively thereto, of a rock-arm journaled on said sleeve transversely of the screw, and rods or bars for connecting the opposite ends of said rock-arm with opposite sides of the press-frame.

3. The combination, with the operating-screw, a loose sleeve confined thereon, as described, and suitable equalizing-levers connecting said sleeve with the opposite sides of the press-frame, of an arm projecting from said sleeve and working in an opening in a part of the press which is stationary as regards horizontal motion, in the manner and for the purpose set forth.

4. In a cider-press, the combination, with the frame, the toggle-levers, the operating screw having a sleeve loosely confined thereon, and an arm projecting therefrom and working in an opening through the follower, of a pair of toggle-jointed levers connected at their free ends to the lower arms of the operating-toggles and at their joint to a sleeve fitted loosely on the above-mentioned arm, as and for the purpose set forth.

5. In a cider-press, the combination, with the operating-screw and the toggle-levers, of a system of equalizing-levers connected to the lower arms of said toggle-levers and to a stayed part of the press, as and for the purpose set forth.

6. The combination, with a cider-press, of a press-board gradually increasing in thickness toward its edges, as explained.

7. The combination, with a cider-press, of a press-board decreasing in thickness for a suitable distance from its margins and having a flat center, as explained.

MARCUS P. SCHENCK.

Witnesses:
JAMES E. SHERIDAN,
H. B. RORKE.